US 6,536,118 B1

(12) United States Patent
Campbell

(10) Patent No.: US 6,536,118 B1
(45) Date of Patent: Mar. 25, 2003

(54) BARBEQUE FORK

(76) Inventor: John R. Campbell, 1375 Whitstable Dr., Roseville, CA (US) 95747

( * ) Notice: Subject to any disclaimer, the term of this patent is extended or adjusted under 35 U.S.C. 154(b) by 41 days.

(21) Appl. No.: 09/822,404

(22) Filed: Mar. 30, 2001

(51) Int. Cl.[7] .................................................. A47J 43/28
(52) U.S. Cl. .............................. 30/322; 294/26; D7/683
(58) Field of Search ...................... 30/322, 137; 294/26; D7/683

(56) References Cited

U.S. PATENT DOCUMENTS

| 1,202,120 | A |   | 10/1916 | Stuckel |  |
|---|---|---|---|---|---|
| 1,313,417 | A | * | 8/1919 | Raymond | 294/26 |
| D148,430 | S |   | 1/1948 | Luhn |  |
| 2,539,849 | A |   | 1/1951 | Lum |  |
| 2,835,971 | A | * | 5/1958 | Neuman | 30/322 |
| 2,864,163 | A | * | 12/1958 | Boruvka | 30/322 |
| 3,162,475 | A |   | 12/1964 | Van Allen |  |
| D265,623 | S | * | 8/1982 | Seibel | D7/683 |
| 4,539,751 | A |   | 9/1985 | Chan |  |
| 4,734,984 | A | * | 4/1988 | Snell et al. | 30/322 |
| D332,554 | S | * | 1/1993 | Gomez et al. | D7/683 |
| 5,228,201 | A | * | 7/1993 | Atkins | 30/322 |
| 5,518,284 | A |   | 5/1996 | Lynn |  |
| 5,896,668 | A |   | 4/1999 | Murrell |  |

* cited by examiner

Primary Examiner—Hwei-Siu Payer

(57) ABSTRACT

The barbeque fork includes a first tine and a second tine. Each of the tines has a first end, a second, a top side, a bottom side, an inner side edge and an outer side edge. The inner side edges and outer side edges tapering from the first end to the second end such that the second ends are pointed. A plate has a top surface, a bottom surface, a front edge, a first side edge and a second side edge. Each of the first ends is integrally coupled to the front edge such that the tines extend in a generally parallel direction with respect to each other. A shank has a first end integrally coupled to the back edge of the plate such that the shank extends away from the plate. A third tine has a first end, a second end, and a pair of side edges tapering toward each other from the first end to the second end. The first end of the third tine is integrally coupled to the outer edge of the first tine and located generally adjacent to the plate.

15 Claims, 2 Drawing Sheets

BARBEQUE FORK

BACKGROUND OF THE INVENTION

1. Field of the Invention

The present invention relates to barbecue forks and more particularly pertains to a new barbeque fork for lifting and turning food items on a grill.

2. Description of the Prior Art

The use of barbecue forks is known in the prior art. More specifically, barbecue forks heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,896,668; U.S. Pat. No. 3,162,475; U.S. Pat. No. 4,539,751; U.S. Pat. No. 5,518,284; U.S. Pat. No. 2,539,849; U.S. Pat. No. 1,202,120; and U.S. Des. Pat. No. 148,430.

While these devices fulfill their respective, particular objectives and requirements, the aforementioned patents do not disclose a new barbeque fork. The inventive device includes a first tine and a second tine. Each of the tines has a first end, a second, a top side, a bottom side, an inner side edge and an outer side edge. The inner side edges and outer side edges tapering from the first end to the second end such that the second ends are pointed. A plate has a top surface, a bottom surface, a front edge, a first side edge and a second side edge. Each of the first ends of the tines is integrally coupled to the front edge of the plate such that the tines extend in a generally parallel direction with respect to each other. A shank has a first end integrally coupled to the back edge of the plate such that the shank extends away from the plate. A third tine has a first end, a second end, and a pair of side edges tapering toward each other from the first end to the second end. The first end of the third tine is integrally coupled to the outer edge of the first tine and located generally adjacent to the plate.

In these respects, the barbeque fork according to the present invention substantially departs from the conventional concepts and designs of the prior art, and in so doing provides an apparatus primarily developed for the purpose of lifting and turning food items on a grill.

SUMMARY OF THE INVENTION

In view of the foregoing disadvantages inherent in the known types of barbecue forks now present in the prior art, the present invention provides a new barbeque fork construction wherein the same can be utilized for lifting and turning food items on a grill.

The general purpose of the present invention, which will be described subsequently in greater detail, is to provide a new barbeque fork apparatus and method which has many of the advantages of the barbecue forks mentioned heretofore and many novel features that result in a new barbeque fork which is not anticipated, rendered obvious, suggested, or even implied by any of the prior art barbecue forks, either alone or in any combination thereof.

To attain this, the present invention generally comprises a first tine and a second tine. Each of the tines has a first end, a second, a top side, a bottom side, an inner side edge and an outer side edge. The inner side edges and outer side edges tapering from the first end to the second end such that the second ends are pointed. A plate has a top surface, a bottom surface, a front edge, a first side edge and a second side edge. Each of the first ends of the tines is integrally coupled to the front edge of the plate such that the tines extend in a generally parallel direction with respect to each other. A shank has a first end integrally coupled to the back edge of the plate such that the shank extends away from the plate. A third tine has a first end, a second end, and a pair of side edges tapering toward each other from the first end to the second end. The first end of the third tine is integrally coupled to the outer edge of the first tine and located generally adjacent to the plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new barbeque fork apparatus and method which has many of the advantages of the barbecue forks mentioned heretofore and many novel features that result in a new barbeque fork which is not anticipated, rendered obvious, suggested, or even implied by any of the prior art barbecue forks, either alone or in any combination thereof.

It is another object of the present invention to provide a new barbeque fork which may be easily and efficiently manufactured and marketed.

It is a further object of the present invention to provide a new barbeque fork which is of a durable and reliable construction.

An even further object of the present invention is to provide a new barbeque fork which is susceptible of a low cost of manufacture with regard to both materials and labor, and which accordingly is then susceptible of low prices of sale to the consuming public, thereby making such barbeque fork economically available to the buying public.

Still yet another object of the present invention is to provide a new barbeque fork which provides in the apparatuses and methods of the prior art some of the advantages thereof, while simultaneously overcoming some of the disadvantages normally associated therewith.

Still another object of the present invention is to provide a new barbeque fork for lifting and turning food items on a grill.

Yet another object of the present invention is to provide a new barbeque fork which includes a first tine and a second tine. Each of the tines has a first end, a second, a top side, a bottom side, an inner side edge and an outer side edge. The inner side edges and outer side edges tapering from the first end to the second end such that the second ends are pointed. A plate has a top surface, a bottom surface, a front edge, a first side edge and a second side edge. Each of the first ends of the tines is integrally coupled to the front edge of the plate such that the tines extend in a generally parallel direction with respect to each other. A shank has a first end integrally coupled to the back edge of the plate such that the shank extends away from the plate. A third tine has a first end, a second end, and a pair of side edges tapering toward each other from the first end to the second end. The first end of the third tine is integrally coupled to the outer edge of the first tine and located generally adjacent to the plate.

Still yet another object of the present invention is to provide a new barbeque fork that has a pair of conventional forward directed tines and a pair of lateral tines for turning food over.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
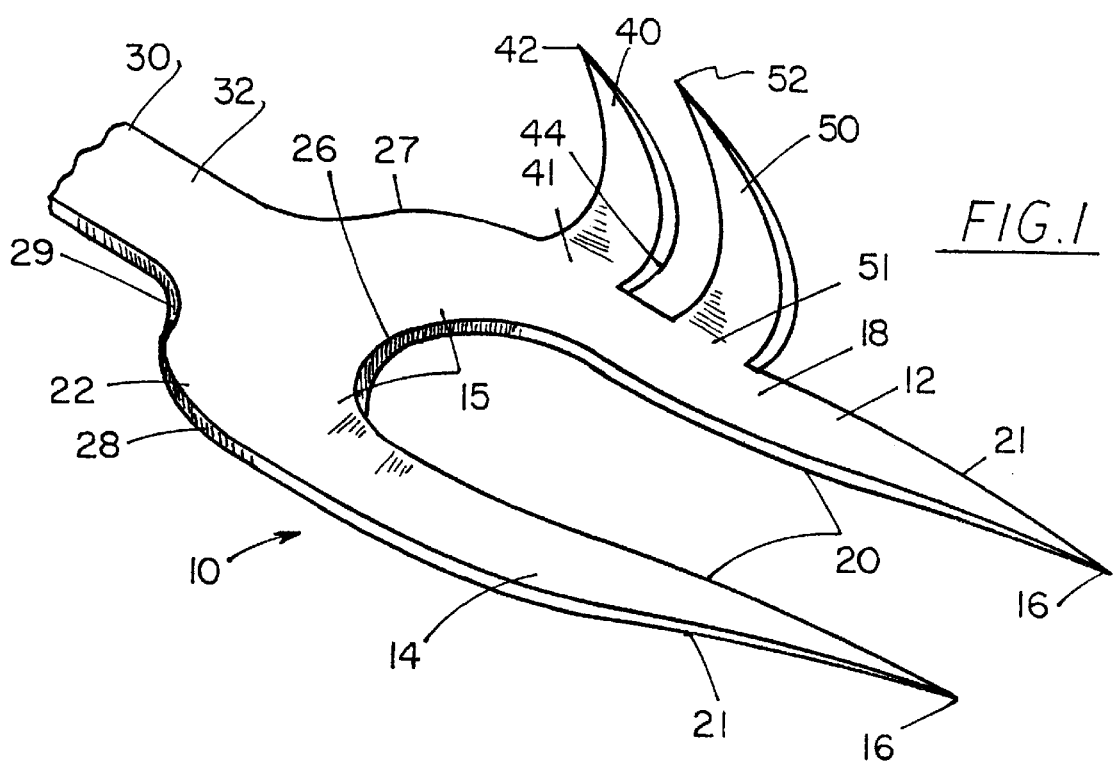
FIG. 1 is a schematic perspective view of a new barbeque fork according to the present invention.
Figure 2:
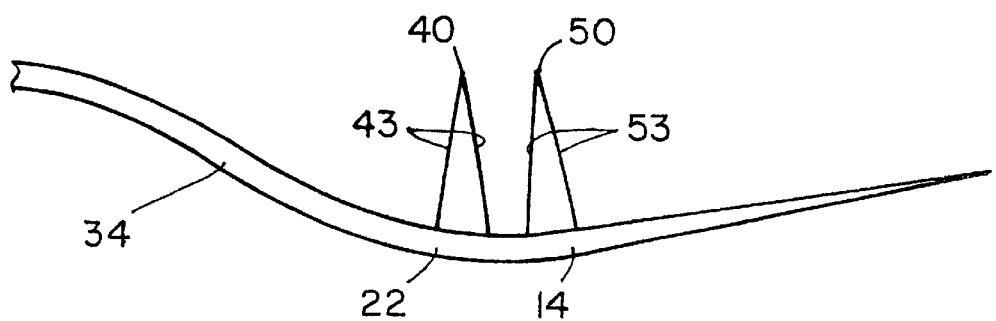
FIG. 2 is a schematic side view of the present invention.
Figure 3:
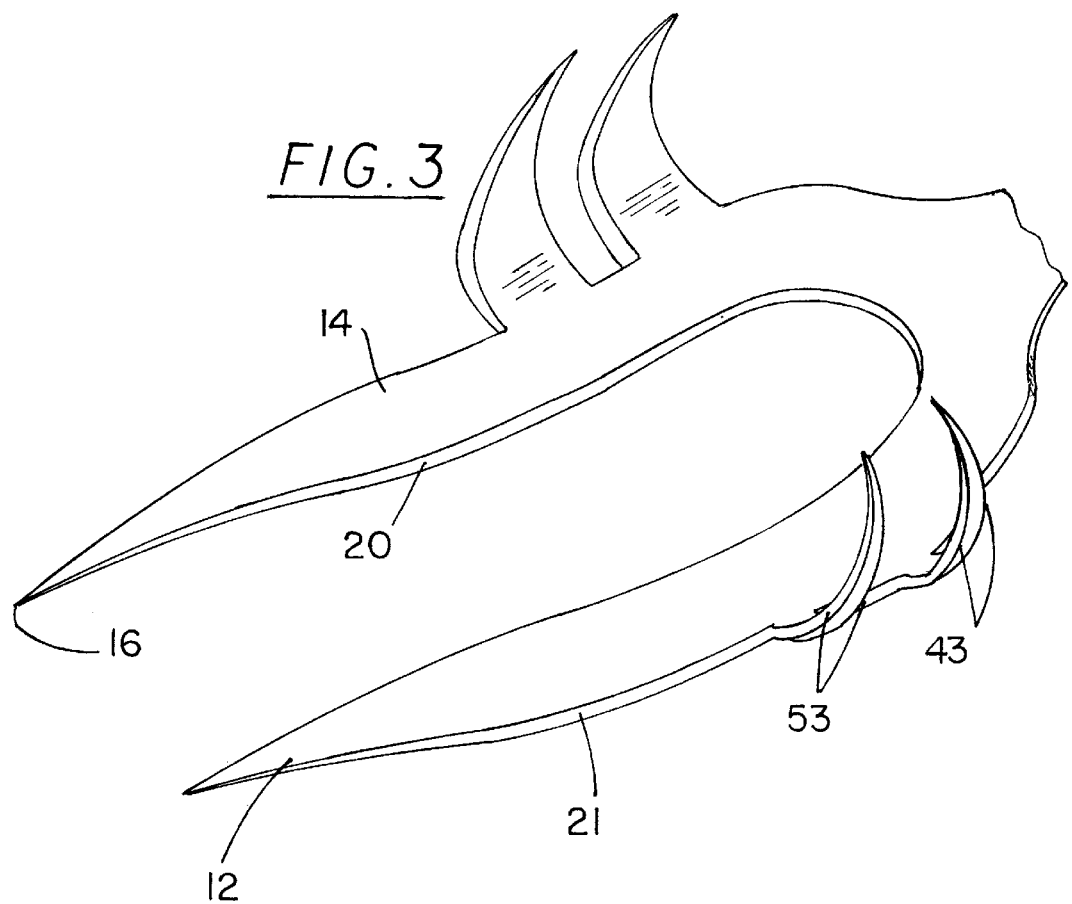
FIG. 3 is a schematic perspective view of the present invention.
Figure 4:
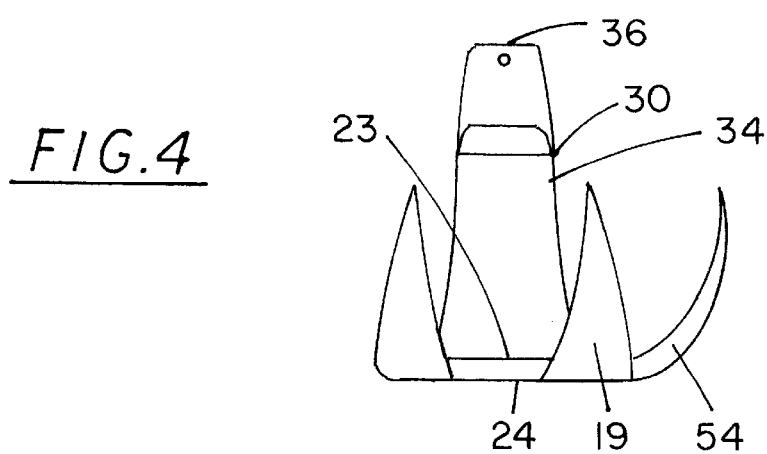
FIG. 4 is a schematic end view of the present invention.

With reference now to the drawings, and in particular to FIGS. 1 through 4 thereof, a new barbeque fork embodying the principles and concepts of the present invention and generally designated by the reference numeral 10 will be described.

As best illustrated in FIGS. 1 through 4, the barbeque fork 10 generally comprises a first tine 12 and a second tine 14. Each of the tines 12, 14, has a first end 15 and a second end 16, a top side 18, a bottom side 19, an inner side edge 20 and an outer side edge 21. The inner side edges 20 and outer side edges 21 tapering from the first end 15 to the second end 16 such that each of the second ends 16 is pointed.

A plate 22, for coupling the first 12 and second 14 tines together, has a top surface 23, a bottom surface 24, a front edge 26, a back edge 29, a first side edge 27 and a second side edge 28. Each of the first ends 15 of the first 12 and second 14 tines is integrally coupled to the front edge 26 of the plate 22 such that the tines 12, 14 extend in a generally parallel direction with respect to each other. The outer side edge 21 of the first tine 12 extends in a continuously smooth transition with the first side edge 27 and the outer side edge 21 of the second tine 14 extends in a continuously smooth transition with the second side edge 28 such that there are no angles or bumps between the tines and the plate. The first 27 and second 28 side edges arc toward the back edge 29. The top sides 18 of the tines 12, 14 are each substantially flush with the top surface 23 of the plate 22 and the bottom sides 19 of the tines 12, 14 are each substantially flush with the bottom surface 24 of the plate 22. The top surface 23 of the plate 22 and a portion of the tines 12, 14 adjacent to the plate 22 are arcuate such that the tines 12, 14 each extend upwardly out of a plane of the plate 22.

A shank 30 has a first end 32 integrally coupled to the back edge 29 of the plate 22 such that the shank 30 extends away from the plate 22. The shank 30 has an arcuate middle portion 34 such that a free end 36 of the shank 30 extends downwardly out of the plane of the plate 22. The shank 30 may be extended into and coupled to a conventional handle member.

A third tine 40 has a first end 41, a second end 42, and a pair of side edges 43 tapering toward each other from the first end 41 to the second end 42. The first end 41 of the third tine 40 is integrally coupled to the outer edge 21 of the first tine 12 and located generally adjacent to the plate 22. The third tine 40 has a bend 44 therein such that the second end 42 of the third tine 40 extends upwardly and generally at a perpendicular orientation with respect to the top surface 23 of the plate 22.

A fourth tine 50 has a first end 51 a second end 52, and a pair of side edges 53 tapering toward each other from the first end 51 to the second end 52. The first end 51 of the fourth tine 50 is integrally coupled to the outer edge 21 of the first tine 12 and located generally adjacent to the third tine 40. The fourth tine 50 has a bend 54 therein such that the second end 52 of the fourth tine 50 extends upwardly at a generally perpendicular orientation with respect to the top surface 23 of the plate 22. Also envisioned are tines which mirror the third and fourth tines but extend upwardly from the second tine 14.

In use, the device allows a user to puncture food with the first and second tines, or the first and second tines may be used to slide under food so that the third and fourth tines can be used to flip food on a grill. The third and fourth tines are also pointed and may also be used for puncturing food.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fork head device for grasping food items, said device comprising:

a first tine and a second tine, each of said tines having a first end and a second end, each of said tines having a top side, a bottom side, an inner side edge and an outer side edge, said inner side edges and said outer side edges tapering from said first end to said second end such that said second ends are pointed;

a plate having a top surface, a bottom surface, a front edge, a back edge, a first side edge and a second side edge, each of said first ends of said tines being integrally coupled to said front edge of said plate such that said tines extend in a generally parallel direction with respect to each other;

a shank having a first end integrally coupled to said back edge of said plate such that said shank extends away from said plate; and a third tine, said third tine having a first end, a second end, and a pair of side edges tapering toward each other from said first end to said second end, said first end of said third tine being integrally coupled to said outer edge of said first tine and located generally adjacent to said plate.

2. The fork head device as in claim 1, wherein said outer side edge of said first tine extends in a continuously smooth transition with said first side edge and said outer side edge of said second tine extends in a continuously smooth transition with said second side edge.

3. The fork head device as in claim 1, wherein said top sides of said first and second tines are each substantially flush with said top surface of said plate and said bottom sides of said first and second tines are each substantially flush with said bottom surface of said plate, the top surface of said plate and a portion of said first and second tines adjacent to said plate being arcuate such that said first and second tines each extend upwardly out of a plane of said plate.

4. The fork head device as in claim 3, wherein said shank has an arcuate middle portion such that a free end of said shank extends downwardly out of a plane of said plate.

5. The fork head device as in claim 4, said third tine having a bend therein such that said second end of said third tine extends upwardly out of a plane of said plate.

6. The fork head device as in claim 5, further including a fourth tine having a first end, a second end, and a pair of side edges tapering toward each other from said first end to said second end, said first end of said fourth tine being integrally coupled to said outer edge of said first tine and located generally adjacent to said third tine, said fourth tine having a bend therein such that said second end of said fourth tine extends upwardly out of a plane of said plate.

7. The fork head device as in claim 5, wherein said third tine extends upwardly at a generally perpendicular orientation with respect to said top surface of said plate.

8. The fork head device as in claim 7, further including a fourth tine having, a first end, a second end, and a pair of side edges tapering toward each other from said first end to said second end, said first end of said fourth tine being integrally coupled to said outer edge of said first tine and located generally adjacent to said third tine, said fourth tine having a bend therein such that said second end of said fourth tine extends upwardly at a generally perpendicular orientation with respect to said top surface of said plate.

9. The fork head device as in claim 1, said third tine having a bend therein such that said second end of said third tine extends upwardly out of a plane of said plate.

10. The fork head device as in claim 9, wherein said third tine extends upwardly at a generally perpendicular orientation with respect to said top surface of said plate.

11. The fork head device as in claim 10, further including a fourth tine having a first end, a second end, and a pair of side edges tapering toward each other from said first end to said second end, said first end of said fourth tine being integrally coupled to said outer edge of said first tine and located generally adjacent to said third tine, said fourth tine having a bend therein such that said second end of said fourth tine extends upwardly at a generally perpendicular orientation with respect to said top surface of said plate.

12. The fork head device as in claim 9, further including a fourth tine having a first end, a second end, and a pair of side edges tapering toward each other from said first end to said second end, said first end of said fourth tine being integrally coupled to said outer edge of said first tine and located generally adjacent to said third tine, said fourth tine having a bend therein such that said second end of said fourth tine extends upwardly out of a plane of said plate.

13. The fork head device as in claim 1, further including a fourth tine having a first end, a second end, and a pair of side edges tapering toward each other from said first end to said second end, said first end of said fourth tine being integrally coupled to said outer edge of said first tine and located generally adjacent to said third tine.

14. A fork head device for grasping food items, said device comprising:

a first tine and a second tine, each of said tines having a first end and a second end, each of said tines having a top side, a bottom side, an inner side edge and an outer side edge, said inner side edges and said outer side edges tapering from said first end to said second end such that said second ends are pointed;

a plate having a top surface, a bottom surface, a front edge, a back edge, a first side edge and a second side edge, each of said first ends of said tines being integrally coupled to said front edge of said plate such that said tines extend in a generally parallel direction with respect to each other, said outer side edge of said first tine extending in a continuously smooth transition with said first side edge and said outer side edge of said second tine extending in a continuously smooth transition with said second side edge, said first and second side edges arcing toward said back edge, said top sides of said tines each being substantially flush with said top surface of said plate and said bottom sides of said tines each being substantially flush with said bottom surface of said plate, the top surface of said plate and a portion of said tines adjacent to said plate being arcuate such that said tines each extend upwardly out of a plane of said plate;

a shank having a first end integrally coupled to said back edge of said plate such that said shank extends away from said plate, said shank having an arcuate middle portion such that a free end of said shank extends downwardly out of a plane of said plate;

a third tine, said third tine having a first end, a second end, and a pair of side edges tapering toward each other from said first end to said second end, said first end of said third tine being integrally coupled to said outer edge of said first tine and located generally adjacent to said plate, said third tine having a bend therein such that said second end of said third tine extends upwardly at a generally perpendicular orientation with respect to said top surface of said plate; and a fourth tine, said fourth tine having a first end, a second end, and a pair of side edges tapering toward each other from said first end to said second end, said first end of said fourth tine being integrally coupled to said outer edge of said first tine and located generally adjacent to said third tine, said fourth tine having a bend therein such that said second end of said fourth tine extends upwardly at a generally perpendicular orientation with respect to said top surface of said plate.

15. The fork head device as in claim 14, further comprising:

a fifth tine and sixth tine each being integrally coupled to and extending upwardly from said second tine, each of said fifth and sixth tines generally being a mirror image of one of said third and fourth tines.

\* \* \* \* \*